(12) United States Patent
Kim et al.

(10) Patent No.: US 11,662,871 B1
(45) Date of Patent: May 30, 2023

(54) APPARATUS, SYSTEM, AND METHOD FOR INTEGRATING CONDUCTIVE COIL WITH INJECTION-MOLDED HOUSING

(71) Applicant: META PLATFORMS TECHNOLOGIES, LLC, Menlo Park, CA (US)

(72) Inventors: Young Bae Kim, San Jose, CA (US); Jong Uk Kim, San Jose, CA (US); Aaron Jacob Steyskal, Redmond, WA (US); Yang Chu, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/743,747

(22) Filed: May 13, 2022

(51) Int. Cl.
  *G06F 3/046* (2006.01)
  *H01F 27/28* (2006.01)
  *G06F 1/16* (2006.01)
  *H01Q 7/00* (2006.01)

(52) U.S. Cl.
  CPC ............ *G06F 3/046* (2013.01); *G06F 1/1601* (2013.01); *H01F 27/28* (2013.01); *G06F 2203/04102* (2013.01); *G06F 2203/04103* (2013.01); *H01Q 7/00* (2013.01)

(58) Field of Classification Search
  CPC .................. G06F 3/046; G06F 1/1601; G06F 2203/04103; G06F 2203/04102
  See application file for complete search history.

(56) References Cited

U.S. PATENT DOCUMENTS

| 2014/0043248 A1* | 2/2014 | Yeh ........................ H01Q 7/00 345/173 |
| 2019/0044216 A1* | 2/2019 | Lu ........................... H01Q 1/38 |

* cited by examiner

*Primary Examiner* — Lisa S Landis
(74) *Attorney, Agent, or Firm* — Greenberg Traurig, LLP

(57) ABSTRACT

The disclosed coil-integrated housing component may include an injection-molded housing dimensioned to house a display module of a computing device. Additionally, the coil-integrated housing component may include a conductive coil integrated into the injection-molded housing to surround a periphery of the display module, wherein the conductive coil may be electronically coupled to the computing device. Various other apparatuses, systems, and methods are also disclosed.

20 Claims, 10 Drawing Sheets

APPARATUS, SYSTEM, AND METHOD FOR INTEGRATING CONDUCTIVE COIL WITH INJECTION-MOLDED HOUSING

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
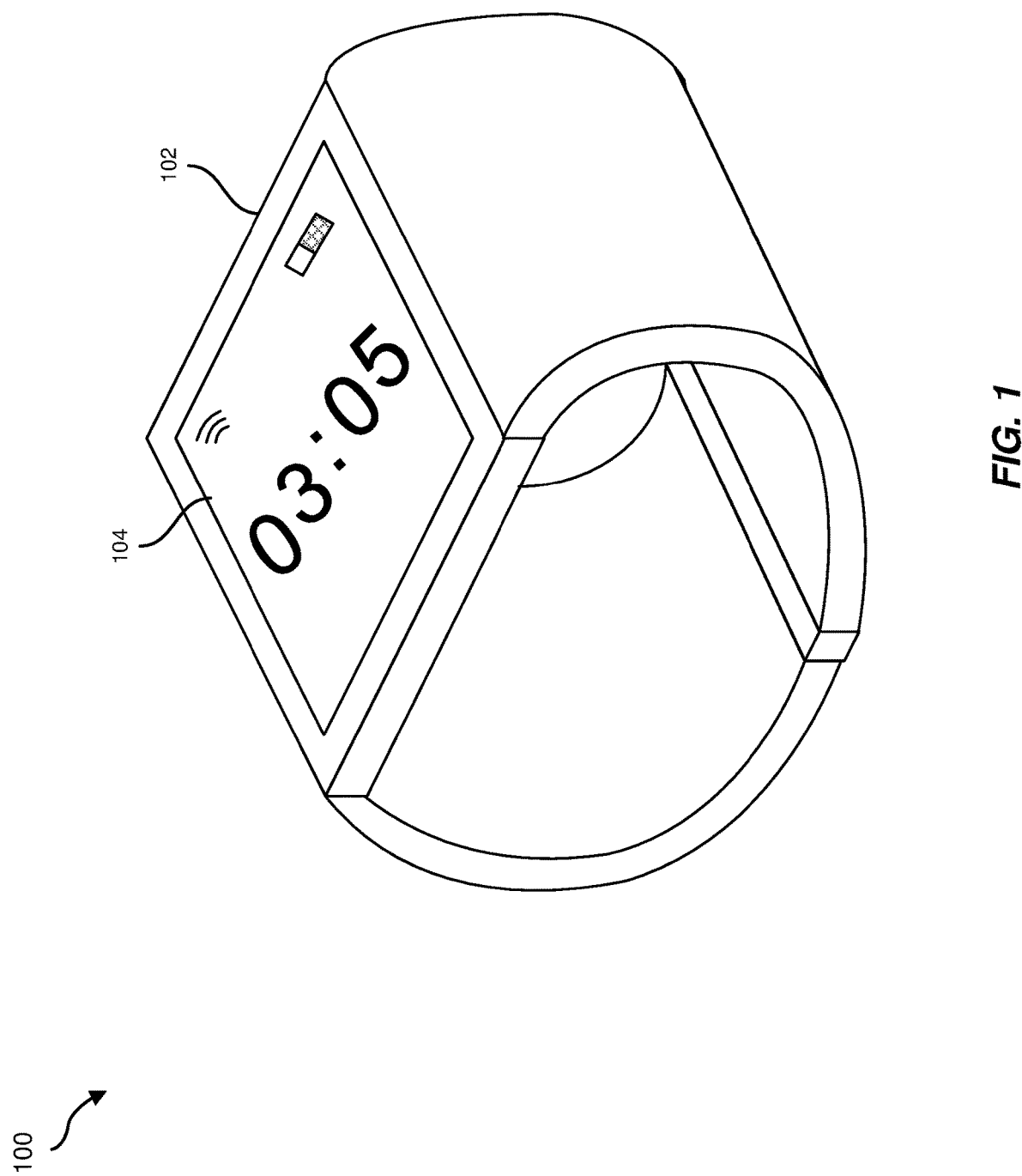
FIG. 1 is a perspective view of an exemplary computing device with an exemplary coil-integrated housing component.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Computing devices often enable users to interact with the devices or enable the devices to communicate with other electronics. For example, smart phones may receive telecommunications signals and may pair with other computing devices to send and receive data. Some computing devices may also detect signals to facilitate user interactions, such as smart watches with touch functions. These types of computing devices may use conductive coils to act as detectors or signal receivers. However, conductive coils may need to be integrated with other electronic components of the device and may require a large amount of space to effectively act as an antenna.

Typically, conductive coils may be placed on a printed circuit board or a flexible printed circuit with a reserved footprint. For some types of conductive coil, such as for near-field communication (NFC) or other types of antennas, a larger coil may improve the sensitivity of the antenna. However, a larger coil may also require more space that may be needed for various other components, such as a battery. To accommodate the larger conductive coil footprint, other methods may change the form factor of the computing device, such as by creating a thicker or wider product. However, this may make products more unwieldy, particularly for portable devices. Thus, better methods of integrating conductive coils into electronic devices are needed to reduce overall device footprints.

The present disclosure is generally directed to an apparatus, system, and method for integrating conductive coils with an injection-molded housing. As will be explained in greater detail below, embodiments of the present disclosure may, by integrating a conductive coil into an injection-molded component that typically does not contain electrical components, effectively reduce the footprint of the conductive coil in a computing device. For example, by incorporating conductive material in the injection-molded periphery of a display module of the computing device, the injection-molded component may function as an antenna. By adding the conductive coil to the injection-molded housing around the display module, which may be a sizeable component, rather than constraining the coil to a smaller circuit board, the disclosed methods may further extend the active area of the conductive coil. By integrating the conductive coil into injection-molded resin, the coil may also improve the mechanical stability of the resin component. Thus, the disclosed apparatus, system, and method may improve over other methods of integrating conductive coil to avoid creating a thicker product.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
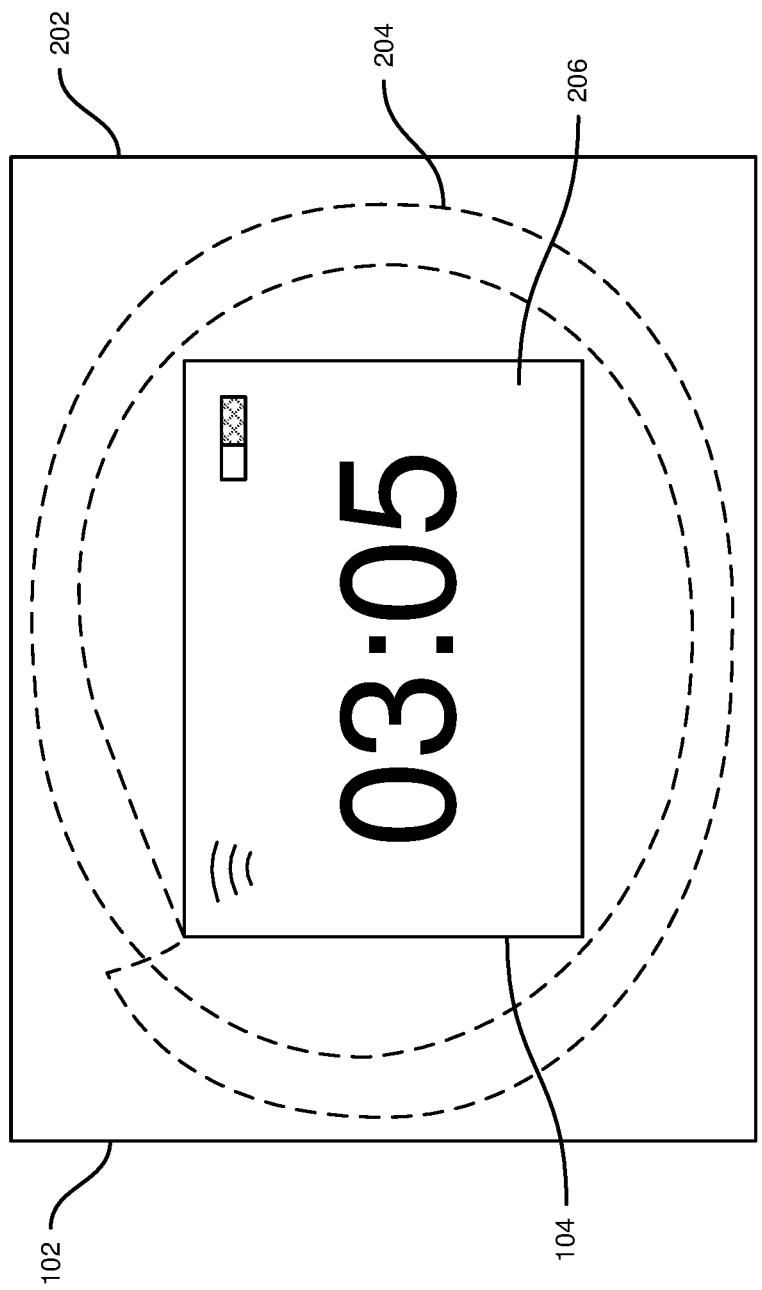
FIG. 2 is a top view of the exemplary computing device with the exemplary coil-integrated housing component.
Figure 3:
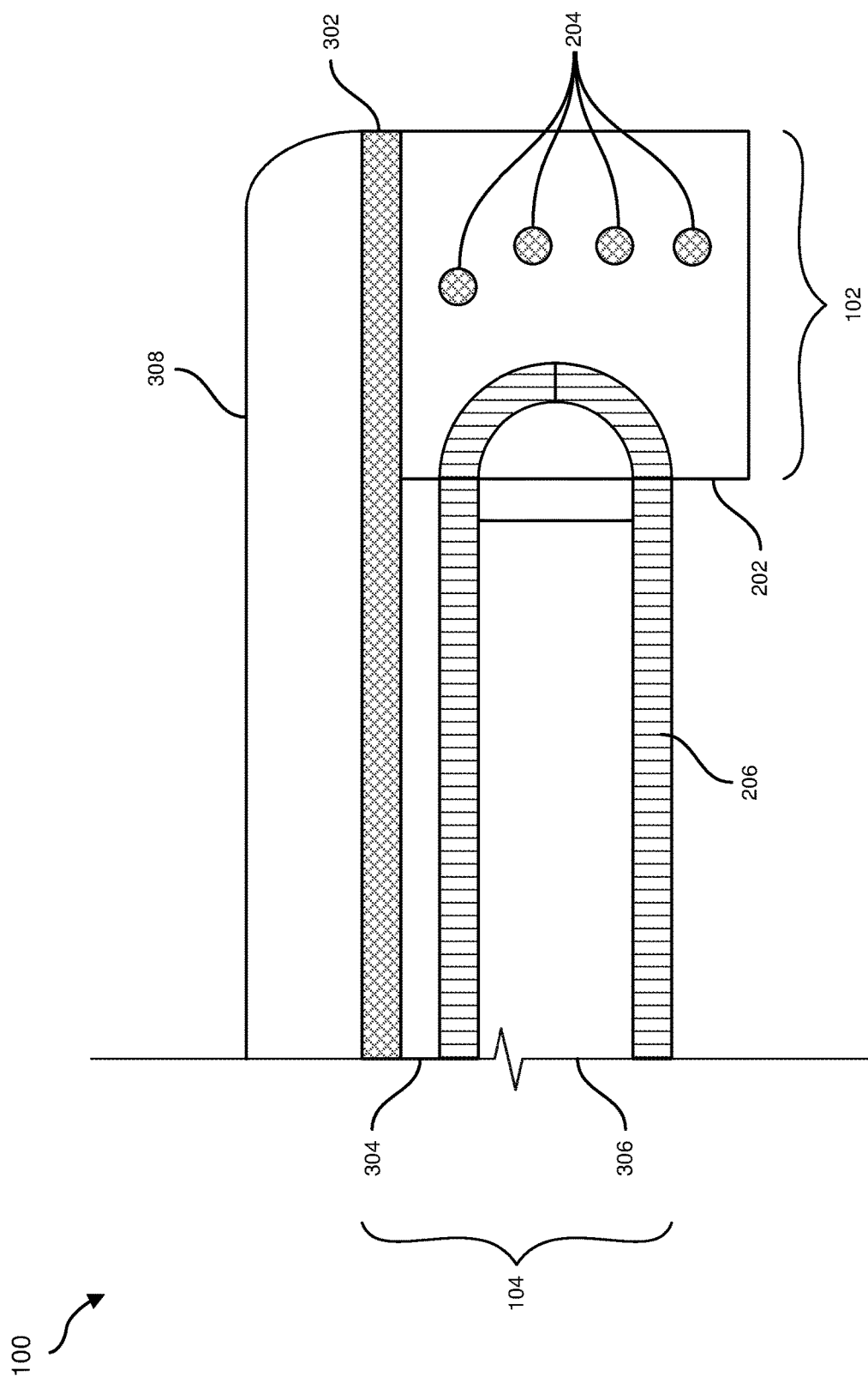
FIG. 3 is a cross-sectional view of an exemplary coil-integrated housing component integrated with an exemplary display module.

The following will provide, with reference to FIGS. 1-3, detailed descriptions of an exemplary computing device with an exemplary coil-integrated housing component. Detailed descriptions of exemplary functions of the exemplary coil-integrated housing component will be provided in connection with FIGS. 4-5. In addition, detailed descriptions of an exemplary method for manufacturing the exemplary coil-integrated housing component will be provided in connection with FIGS. 6 and 8. Furthermore, detailed descriptions of exemplary functions of the exemplary computing device will be provided in connection with FIG. 7. Finally, detailed descriptions of exemplary augmented-reality and virtual-reality systems that may incorporate coil-integrated housing components will be provided in connection with FIGS. 9 and 10.

FIG. 1 illustrates a perspective view of an exemplary computing device 100 with an exemplary coil-integrated housing component 102 and an exemplary display module 104. In some examples, coil-integrated housing component 102 may be dimensioned to house display module 104. In these examples, display module 104 may display a digital image to a user of computing device 100. In the example of FIG. 1, computing device 100 may represent a smart watch with a digital screen, and coil-integrated housing component 102 may enable the smart watch to pair with other computing devices.

In some embodiments, computing device 100 may generally represent any type or form of computing device capable of sending and/or receiving signals. Examples of computing device 100 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device.

FIG. 2 illustrates a top view of computing device 100 with coil-integrated housing component 102 and display module 104. In one embodiment, coil-integrated housing component 102 may include an injection-molded housing 202 dimensioned to house display module 104 of computing device 100. In some embodiments, the terms "injection molding" and "injection-molded" may refer to a process of manufacturing components by injecting a substantially fluid substance into a mold or hollow cast and curing or hardening the substance to hold a shape. For example, injection-molded housing 202 may be manufactured by injecting a molten polymer into a mold and curing the molten polymer to create a solid component.

In some examples, display module 104 may include a display screen 206 visible to a user of computing device 100. In these examples, injection-molded housing 202 may be dimensioned to frame display screen 206 of display module 104 such that display screen 206 is visibly exposed. In the example of FIGS. 1 and 2, injection-molded housing 202 may frame display screen 206 to expose the digital display of a smart watch. In other examples, display screen 206 may have rounded corners, a circular shape, or any other suitable shape or form. In other embodiments, computing device 100 may represent different devices with display screens framed by appropriated structured injection-molded housing 202. For example, computing device 100 may represent a smart phone with a bezel-less display screen 206, and injection-molded housing 202 may frame the underside of display screen 206 to avoid obstructing the edge of display screen 206.

In some embodiments, coil-integrated housing component 102 may also include a conductive coil 204 integrated into injection-molded housing 202 to surround a periphery of display module 104, wherein conductive coil 204 may be electronically coupled to computing device 100. In these embodiments, conductive coil 204 may represent a flexible metal shaped to wrap around the periphery of display module 104 one or more turns. For example, conductive coil 204 may be a copper wire or other malleable and conductive metal. Additionally, conductive coil 204 may be integrated into injection-molded housing 202 to increase a mechanical stability of injection-molded housing 202. For example, by adding conductive coil 204 to create a metal-polymer composite, coil-integrated housing component 102 may produce a mechanical and structural stability greater than that of a polymer injection-molded housing alone.

FIG. 3 illustrates a cross-sectional view of coil-integrated housing component 102 and display module 104 of computing device 100. In some examples, coil-integrated housing component 102 may be dimensioned to frame display screen 206 such that a gap between coil-integrated housing component 102 and an edge of display screen 206 is minimized. In these examples, injection-molded housing 202 may encapsulate display module 104 to minimize the gap between injection-molded housing 202 and the edge of display screen 206. As illustrated in FIG. 3, a portion of display screen 206 may be encompassed by injection-molded housing 202. By minimizing the gap, the disclosed methods may enable computing device 100 to retain the same form factor with the addition of coil-integrated housing component 102. Additionally, conductive coil 204 may include multiple turns, such as the cross-sectional depictions of four separate turns as illustrated in FIG. 3.

In some embodiments, display module 104 may include one or more of a polarizer, an organic light-emitting diode (OLED) panel, a printed circuit board (PCB), and/or optically clear adhesive (OCA). In some examples, the term "polarizer" may refer to an optical filter for a range of polarization of light waves. In some examples, the term "light-emitting diode" may refer to a type of semiconductor light that emits light in response to detecting an electric current. In some examples, the term "organic light-emitting diode" may refer to a type of light-emitting diode with a layer of organic compound that emits light in response to detecting an electric current. In some examples, the term "printed circuit board" may refer to a physical board on which computing components may be attached or embedded such that the board provides electrical connections between the computing components.

In the example of FIG. 3, display module 104 may represent a stack of layered components including a polarizer 304, display screen 206, and a PCB 306. In this example, OCA 302 may be applied to bond separate components of display module 104 without visually obstructing a component, such as display screen 206. For example, OCA 302 may be applied to display screen 206 and polarizer 304 to avoid obstructing light waves. Alternatively, layers below display screen 206 may not require OCA and may be bonded with other types of adhesives. In other examples, display module 104 may include multiple similar or other components, and components may be layered in different configurations. As illustrated in FIG. 3, display screen 206 may represent a bendable OLED panel, such as a plastic panel with integrated OLED lighting, partially housed by coil-integrated housing component 102. In other examples, display screen 206 may represent an alternate type of digital screen and/or may be distinctly separated from coil-integrated housing component 102.

In some embodiments, computing device 100 may include a substantially transparent cover 308 coupled to coil-integrated housing component 102 such that cover 308 overlaps display screen 206 of display module 104. In these embodiments, cover 308 may be coupled to display module 104 and/or coil-integrated housing component 102 with OCA, such as a layer of OCA 302. For example, cover 308 may represent a glass or transparent plastic material covering display module 104 and coil-integrated housing component 102 to provide protection.

Figure 4:
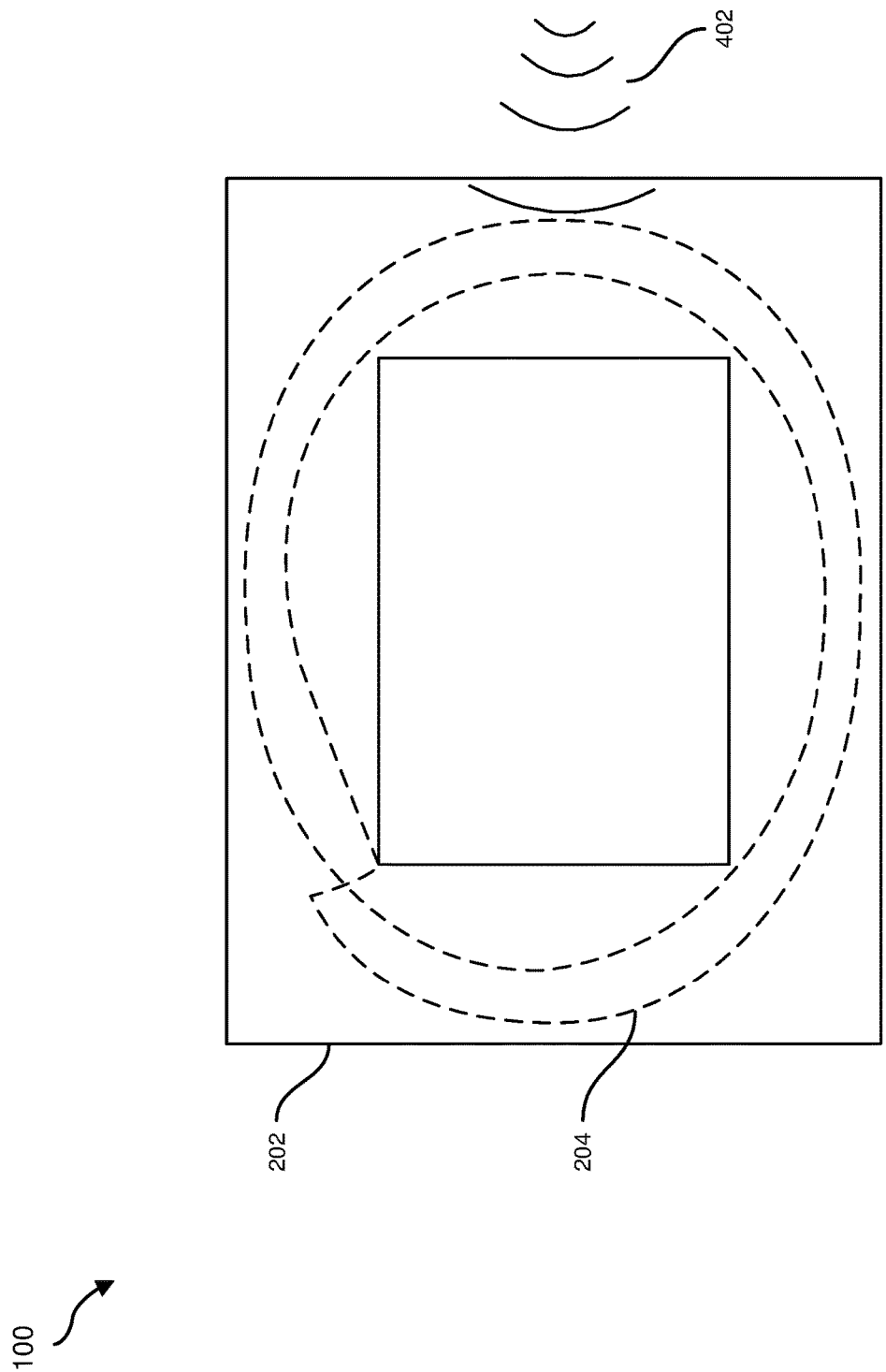
FIG. 4 is an illustration of the exemplary coil-integrated housing component functioning as an antenna.

FIG. 4 is an illustration of coil-integrated housing component 102 functioning as an antenna. In one example, conductive coil 204 may be dimensioned to function as an antenna to receive an electromagnetic signal 402 to computing device 100. For example, conductive coil 204 may be looped with one or more windings to detect changes in electric fields and/or magnetic fields. In this example, electromagnetic signal 402 may represent an NFC signal and/or a wireless broadband signal, such as Long-Term Evolution (LTE) or 5G signals. Conductive coil 204 may then detect the approach of electromagnetic signal 402 and/or may send a signal from computing device 100.

In the above examples, conductive coil 204 may detect and/or send electromagnetic signal 402 through a material of injection-molded housing 202. In these examples, injection-molded housing 202 may be formed from a resin monomer or similar plastic or any other suitable material that does not significantly obstruct electromagnetic signal 402.

Figure 5:
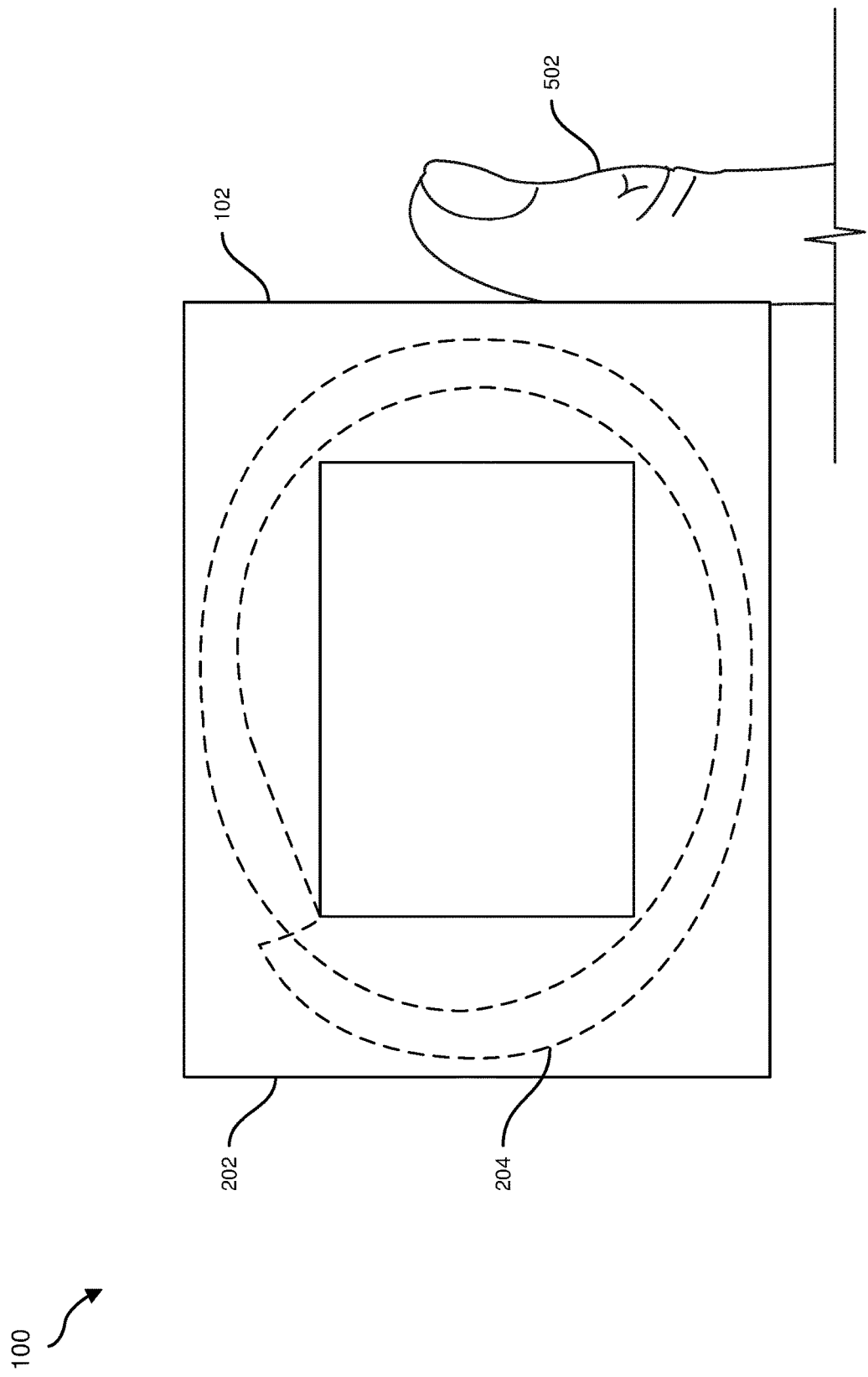
FIG. 5 is an illustration of the exemplary coil-integrated housing component detecting a user's touch.

FIG. 5 is an illustration of coil-integrated housing component 102 detecting a user's touch. In one embodiment, conductive coil 204 may generate an electrostatic field that detects a user's touch to injection-molded housing 202 of coil-integrated housing component 102. In some examples, the term "electrostatic field" may refer to a static electric field around electrically charged particles created by an electromagnetic force. In the example of FIG. 5, a user 502 may touch a finger to coil-integrated housing component 102 of computing device 100, and conductive coil 204 may detect a fluctuation in the electrostatic field due to the touch.

In the above embodiments, the user's touch may activate a touch function or a gesture function of computing device 100. For example, conductive coil 204 may detect a location of the fluctuation in the electrostatic field and activate different functions depending on the location around the perimeter of coil-integrated housing component 102. In other embodiments, conductive coil 204 may detect an electrical resistance and/or user 502 may perform a gesture close to coil-integrated housing component 102 without physical touch to activate a function of computing device 100.

Figure 6:
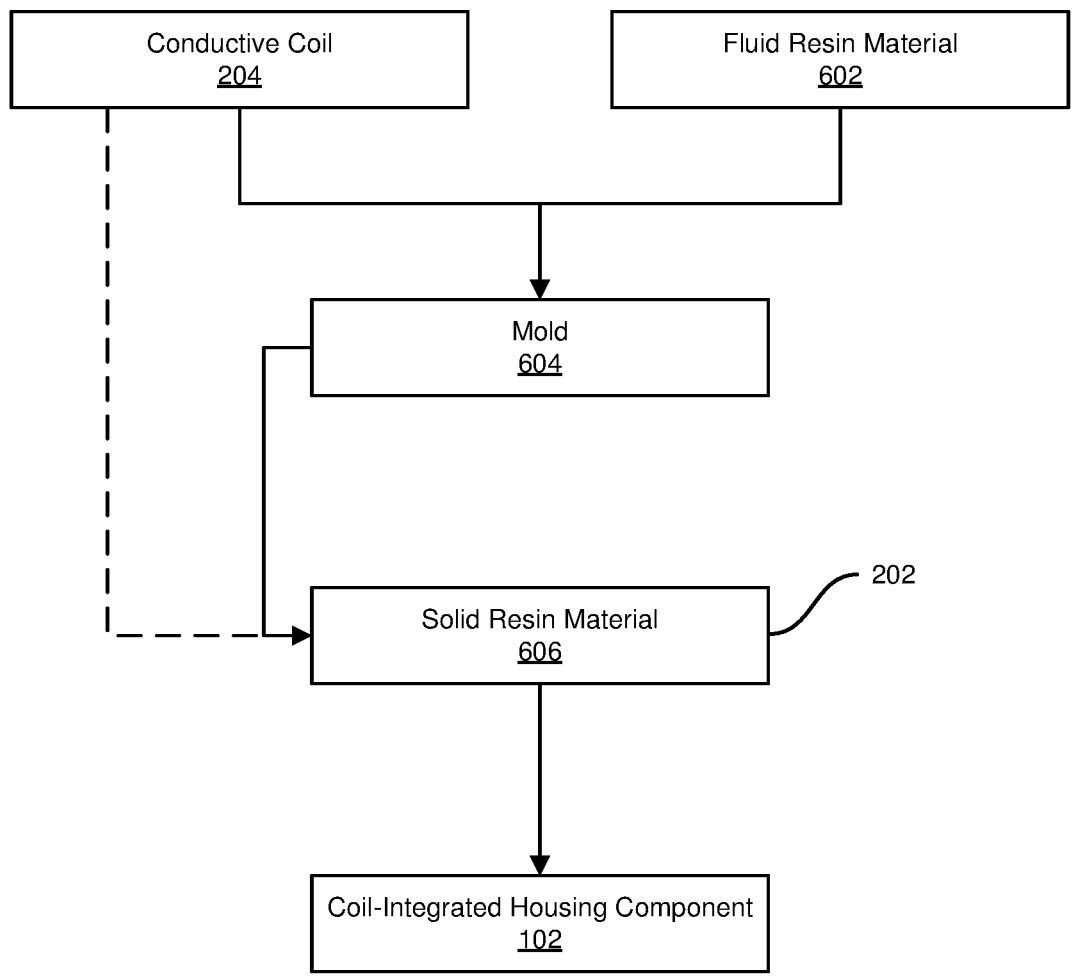
FIG. 6 is a block diagram of an exemplary process of manufacturing the exemplary coil-integrated housing component.

FIG. 6 shows a block diagram of an exemplary process of manufacturing coil-integrated housing component 102. As shown in FIG. 6, conductive coil 204 may be added to a mold 604, and a fluid resin material 602 may be injected or poured into mold 604 to encompass the set conductive coil 204. In this embodiment, fluid resin material 602 may then be cured into a solid resin material 606, thereby producing coil-integrated housing component 102. In this embodiment, injection-molded housing 202 may represent solid resin material 606 cured from fluid resin material 602.

In an alternate embodiment, fluid resin material 602 may first be injected into mold 604 and cured into solid resin material 606. In this embodiment, conductive coil 204 may be inserted or attached to the resulting injection-molded housing 202. For example, a copper wire may be threaded into gaps left in injection-molded housing 202 or a molten conductive material may be applied to injection-molded housing 202.

Figure 7:
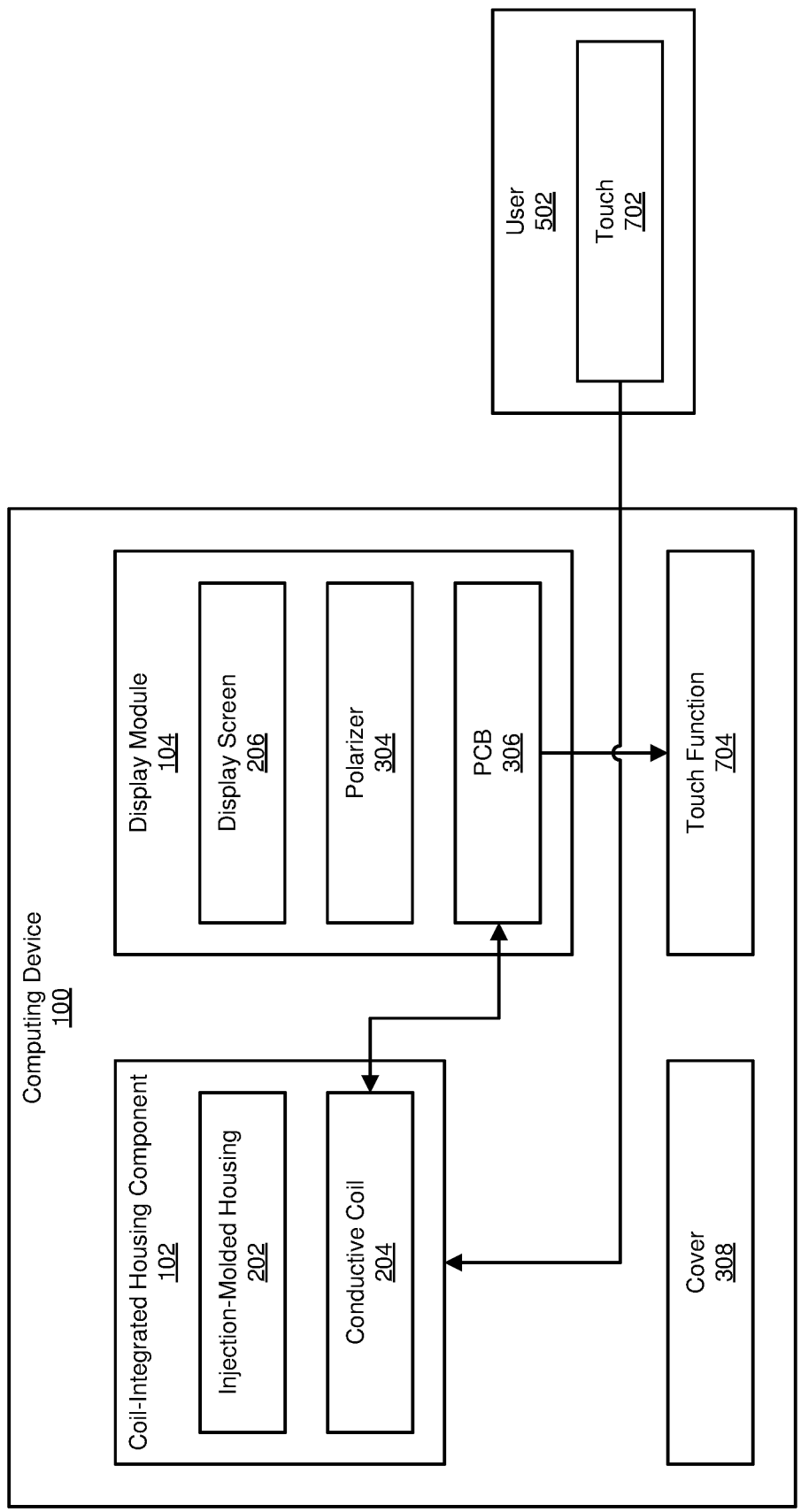
FIG. 7 is a block diagram of the exemplary computing device with the exemplary coil-integrated housing component.

FIG. 7 shows a block diagram of computing device 100 with coil-integrated housing component 102. In the example of FIG. 7, computing device 100 may include coil-integrated housing component 102, display module 104, and cover 308. In this example, coil-integrated housing component 102 may include injection-molded housing 202 and conductive coil 204. Additionally, display module 104 may include display screen 206, polarizer 304, and PCB 306, and conductive coil 204 may be electronically coupled to PCB 306. For example, the ends of conductive coil 204 may be connected to PCB 306 and/or a power source of computing device 100. In this example, conductive coil 204 may then detect a touch 702 of user 502 to coil-integrated housing component 102. By relaying the detection of touch 702 to PCB 306, conductive coil 204 may activate a touch function 704 of computing device 100.

Figure 8:
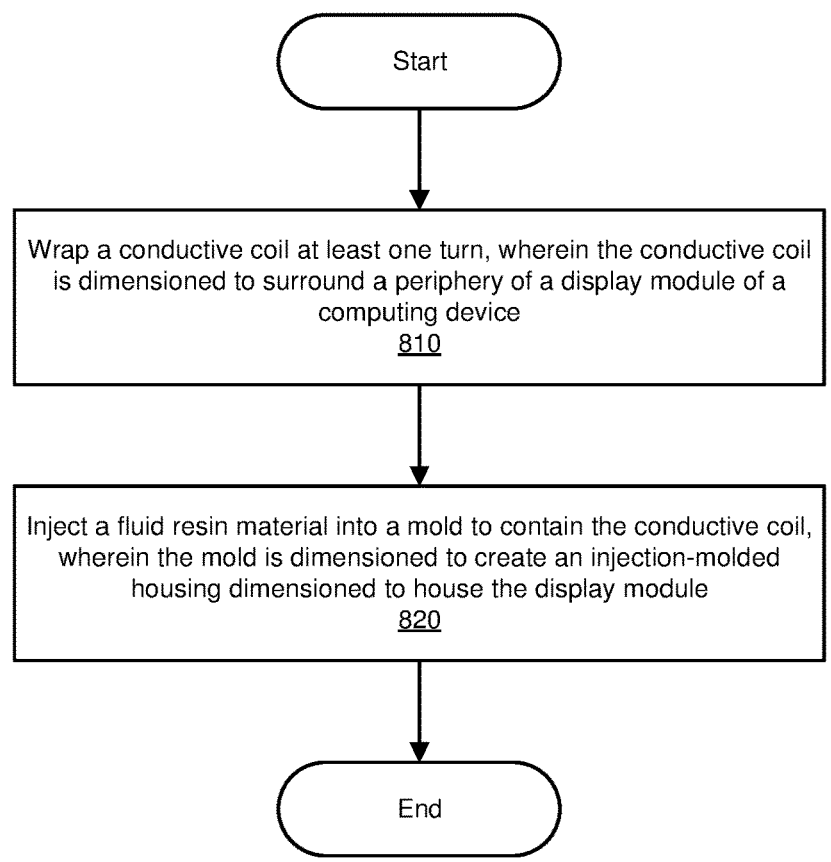
FIG. 8 is a flow diagram of an exemplary method for manufacturing a coil-integrated housing component.

FIG. 8 shows an example method for manufacturing, assembling, using, adjusting, or otherwise configuring or creating the systems and apparatuses presented herein. The steps shown in FIG. 8 may be performed by any individual and/or by any suitable type or form of manual and/or automated apparatus. In particular, FIG. 8 illustrates a flow diagram of an exemplary method 800 for manufacturing coil-integrated housing components.

As shown in FIG. 8, at step 810 one or more of the systems described herein may wrap a conductive coil one or more turns, wherein the conductive coil may be dimensioned to surround a periphery of a display module of a computing device. For example, as illustrated in FIG. 2, conductive coil 204 may be wrapped multiple turns around the periphery of display module 104 of computing device 100.

The systems described herein may perform step 810 in a variety of ways. In one example, conductive coil 204 may be set into a mold dimensioned to fit the periphery of the display module, such as mold 604 of FIG. 6. In other examples, conductive coil 204 may be physically wrapped around display module 104 and subsequently removed while maintaining the wrapped shape. In some examples, conductive coil 204 may be electronically coupled to computing device 100, such as by coupling conductive coil 204 to PCB 306 in FIG. 3. In these examples, conductive coil 204 may be electronically coupled to computing device 100 prior to integrating conductive coil 204 into coil-integrated housing component 102 or after integration.

Returning to FIG. 8, at step 820, one or more of the systems described herein may inject a fluid resin material into a mold to contain the conductive coil, wherein the mold may be dimensioned to create an injection-molded housing dimensioned to house the display module. For example, as illustrated in FIG. 6, fluid resin material 602 may be injected into mold 604 to create injection-molded housing 202.

The systems described herein may perform step 820 in a variety of ways. In some embodiments, mold 604 may include a hollow space dimensioned to fit display module 104. In these embodiments, conductive coil 204 may be set in position in mold 604, and fluid resin material 602 may be injected or poured into mold 604 to encompass conductive coil 204 and fill in empty spaces in mold 604. In these embodiments, fluid resin material 602 may then be cured and/or hardened such that injection-molded housing 202 is composed of solid resin material 606. For example, conductive coil 204 may be wrapped around display module 104 of a smart watch or smart phone, and molten resin may be injected to create coil-integrated housing component 102 that contains the wrapped conductive coil 204 and that houses display module 104.

In some examples, method 800 may further include a step in which the conductive coil may be inserted into the cured injection-molded housing. For example, in alternate methods, injection-molded housing 202 may first be cured from fluid resin material 602 without conductive coil 204. In this example, conductive coil 204 may then be inserted into or otherwise applied to cured injection-molded housing 202 to create coil-integrated housing component 102.

As discussed throughout the present disclosure, the disclosed methods, systems, and apparatuses may provide one or more advantages over other placements of conductive coils in computing devices. For example, conductive coils may often be placed on a circuit board and may take up a significant portion of the circuit board. These methods may have to balance the tradeoff between a larger device to accommodate the coil footprint or a smaller, and therefore less sensitive, conductive coil. In contrast, the disclosed apparatuses integrate a conductive coil into a display housing, which typically does not contain electrical components, to avoid taking up additional space. Specifically, by using an injection molding process to contain the conductive coil within the display housing, the disclosed methods may reduce the need for a large coil footprint. In addition, by incorporating the conductive coil into a larger component such as the injection-molded display housing, the disclosed methods may maintain a necessary size for improved sensitivity of signal detection. Additionally, the combination of the conductive coil and injection-molded resin may increase a structural stability of the display housing. Thus, the methods, systems, and apparatuses described herein may improve the integration of conductive coils into injection-molded components.

EXAMPLE EMBODIMENTS

Example 1: A coil-integrated housing component may include 1) an injection-molded housing dimensioned to house a display module of a computing device and 2) a conductive coil integrated into the injection-molded housing to surround a periphery of the display module, wherein the conductive coil is electronically coupled to the computing device.

Example 2: The coil-integrated housing component of Example 1, wherein the injection-molded housing may include a solid resin material cured from a fluid resin material.

Example 3: The coil-integrated housing component of any of Examples 1 and 2, wherein the injection-molded housing may be dimensioned to frame a display screen of the display module such that the display screen is visibly exposed.

Example 4: The coil-integrated housing component of any of Examples 1-3, wherein the injection-molded housing may encapsulate the display module to minimize a gap between the injection-molded housing and an edge of the display screen.

Example 5: The coil-integrated housing component of any of Examples 1-4, wherein the conductive coil may include a flexible metal shaped to wrap around the periphery of the display module one or more turns.

Example 6: The coil-integrated housing component of any of Examples 1-5, wherein the conductive coil may be dimensioned to function as an antenna to detect an electromagnetic signal through a material of the injection-molded housing.

Example 7: The coil-integrated housing component of any of Examples 1-6, wherein the conductive coil may generate an electrostatic field that detects a user's touch to the injection-molded housing.

Example 8: The coil-integrated housing component of any of Examples 1-7, wherein the conductive coil may be integrated into the injection-molded housing to increase a mechanical stability of the injection-molded housing.

Example 9: A computing device may include 1) a display module with a display screen visible to a user of the computing device, 2) a coil-integrated housing component dimensioned to house the display module, wherein a conductive coil of the coil-integrated housing component surrounds a periphery of the display module, and 3) a substantially transparent cover coupled to the coil-integrated housing component such that the cover overlaps the display screen of the display module.

Example 10: The computing device of Example 9, wherein the display module may include one or more of a polarizer, an organic light-emitting diode (OLED) panel, a printed circuit board (PCB), and/or optically clear adhesive (OCA).

Example 11: The computing device of any of Examples 9 and 10, wherein the display screen may include a bendable OLED panel partially housed by the coil-integrated housing component.

Example 12: The computing device of any of Examples 9-11, wherein the coil-integrated housing component may be dimensioned to frame the display screen such that a gap between the coil-integrated housing component and an edge of the display screen is minimized.

Example 13: The computing device of any of Examples 9-12, wherein the conductive coil may be dimensioned to function as an antenna to receive an electromagnetic signal to the computing device.

Example 14: The computing device of any of Examples 9-13, wherein the conductive coil may generate an electrostatic field that detects a user's touch to the coil-integrated housing component.

Example 15: The computing device of any of Examples 9-14, wherein the user's touch may activate one or more of a touch function of the computing device and/or a gesture function of the computing device.

Example 16: The computing device of any of Examples 9-15, wherein the cover may be coupled to the display module with OCA.

Example 17: A method of manufacturing may include 1) wrapping a conductive coil one or more turns, wherein the conductive coil is dimensioned to surround a periphery of a display module of a computing device and 2) injecting a fluid resin material into a mold to contain the conductive coil, wherein the mold is dimensioned to create an injection-molded housing dimensioned to house the display module.

Example 18: The method of Example 17, wherein the conductive coil may be electronically coupled to the computing device.

Example 19: The method of any of Examples 17 and 18, wherein the method may further include curing the fluid resin material such that the injection-molded housing comprises a solid resin material.

Example 20: The method of any of Examples 17-19, wherein the method may further include inserting the conductive coil into the cured injection-molded housing.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
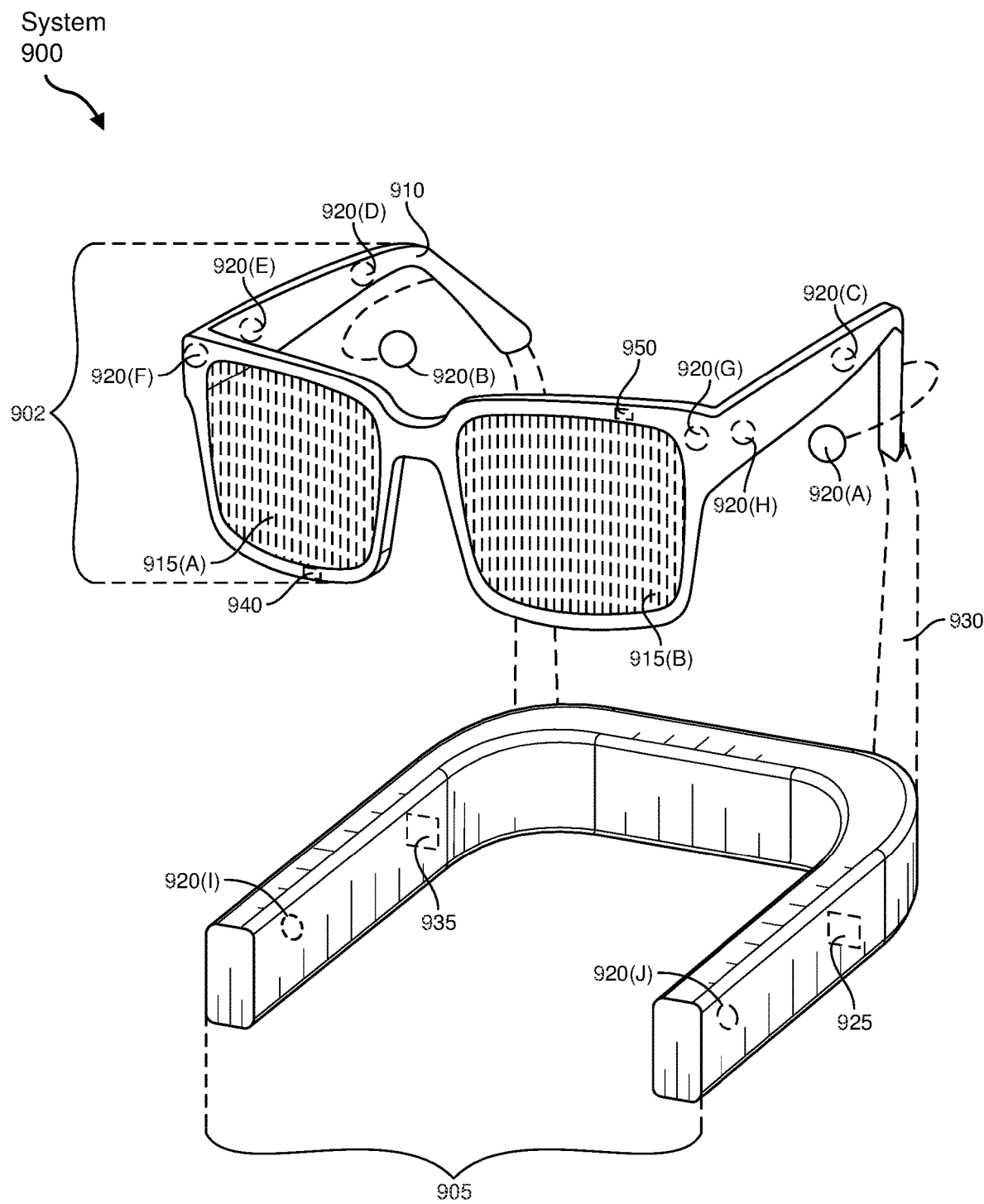
FIG. 9 is an illustration of exemplary augmented-reality glasses that may be used in connection with embodiments of this disclosure.
Figure 10:
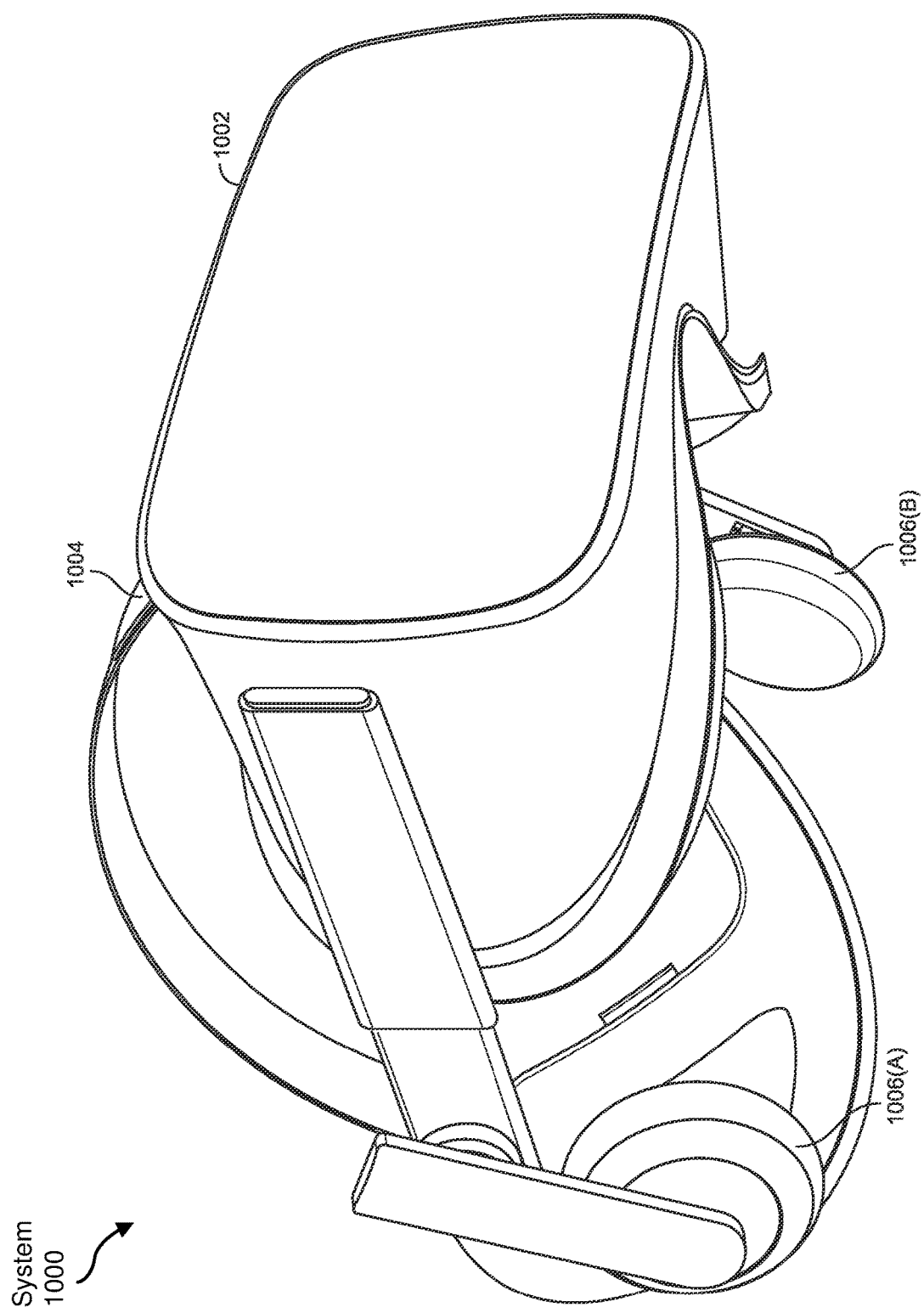
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality system 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(1) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(1) and 920(J) may be positioned on neckband 905, thereby increasing the distance between the neckband acoustic transducers 920(1) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light processing (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, bodysuits, handheld controllers, environmental devices (e.g., chairs, floor mats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A coil-integrated housing component comprising:
an injection-molded housing dimensioned to house a display module of a computing device; and a conductive coil integrated into the injection-molded housing to surround a periphery of the display module, wherein the conductive coil is electronically coupled to the computing device.

2. The coil-integrated housing component of claim 1, wherein the injection-molded housing comprises a solid resin material cured from a fluid resin material.

3. The coil-integrated housing component of claim 1, wherein the injection-molded housing is dimensioned to frame a display screen of the display module such that the display screen is visibly exposed.

4. The coil-integrated housing component of claim 3, wherein the injection-molded housing encapsulates the display module to minimize a gap between the injection-molded housing and an edge of the display screen.

5. The coil-integrated housing component of claim 1, wherein the conductive coil comprises a flexible metal shaped to wrap around the periphery of the display module at least one turn.

6. The coil-integrated housing component of claim 1, wherein the conductive coil is dimensioned to function as an antenna to detect an electromagnetic signal through a material of the injection-molded housing.

7. The coil-integrated housing component of claim 1, wherein the conductive coil generates an electrostatic field that detects a user's touch to the injection-molded housing.

8. The coil-integrated housing component of claim 1, wherein the conductive coil is integrated into the injection-molded housing to increase a mechanical stability of the injection-molded housing.

9. A computing device comprising:
a display module with a display screen visible to a user of the computing device;
a coil-integrated housing component dimensioned to house the display module, wherein a conductive coil of the coil-integrated housing component surrounds a periphery of the display module; and
a substantially transparent cover coupled to the coil-integrated housing component such that the cover overlaps the display screen of the display module.

10. The computing device of claim 9, wherein the display module comprises at least one of:

a polarizer;
an organic light-emitting diode (OLED) panel;
a printed circuit board (PCB); or
optically clear adhesive (OCA).

11. The computing device of claim 9, wherein the display screen comprises a bendable OLED panel partially housed by the coil-integrated housing component.

12. The computing device of claim 9, wherein the coil-integrated housing component is dimensioned to frame the display screen such that a gap between the coil-integrated housing component and an edge of the display screen is minimized.

13. The computing device of claim 9, wherein the conductive coil is dimensioned to function as an antenna to receive an electromagnetic signal to the computing device.

14. The computing device of claim 9, wherein the conductive coil generates an electrostatic field that detects a user's touch to the coil-integrated housing component.

15. The computing device of claim 14, wherein the user's touch activates at least one of:
a touch function of the computing device; or
a gesture function of the computing device.

16. The computing device of claim 9, wherein the cover is coupled to the display module with OCA.

17. A method of manufacturing comprising:
wrapping a conductive coil at least one turn, wherein the conductive coil is dimensioned to surround a periphery of a display module of a computing device; and
injecting a fluid resin material into a mold to contain the conductive coil, wherein the mold is dimensioned to create an injection-molded housing dimensioned to house the display module.

18. The method of claim 17, wherein the conductive coil is electronically coupled to the computing device.

19. The method of claim 17, further comprising curing the fluid resin material such that the injection-molded housing comprises a solid resin material.

20. The method of claim 19, further comprising inserting the conductive coil into the cured injection-molded housing.

* * * * *